(12) United States Patent
Steinlechner

(10) Patent No.: US 9,670,899 B2
(45) Date of Patent: *Jun. 6, 2017

(54) LOW-PROFILE POWER-GENERATING WIND TURBINE

(71) Applicant: WATTENBERG INDUSTRIES, LLC, Palm Springs, CA (US)

(72) Inventor: Johann Steinlechner, Palm Springs, CA (US)

(73) Assignee: WATTENBERG INDUSTRIES, LLC, Palm Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,568

(22) Filed: May 27, 2014

(65) Prior Publication Data
US 2014/0265346 A1 Sep. 18, 2014

Related U.S. Application Data

(63) Continuation of application No. 13/009,735, filed on Jan. 19, 2011, now Pat. No. 8,791,588.

(60) Provisional application No. 61/296,280, filed on Jan. 19, 2010.

(51) Int. Cl.
| | |
|---|---|
| F03D 9/00 | (2016.01) |
| H02P 9/04 | (2006.01) |
| F03D 1/04 | (2006.01) |
| F03D 1/06 | (2006.01) |

(52) U.S. Cl.
CPC .............. *F03D 1/04* (2013.01); *F03D 1/065* (2013.01); *F03D 9/002* (2013.01); *F05B 2240/13* (2013.01); *Y02B 10/30* (2013.01); *Y02E 10/721* (2013.01); *Y02E 10/725* (2013.01)

(58) Field of Classification Search
USPC ....................................... 290/44, 55
See application file for complete search history.

(56) References Cited

U.S. PATENT DOCUMENTS

| 129,567 | A | * | 7/1872 | Jones | ......................... F03D 1/04 |
|---|---|---|---|---|---|
| | | | | | 236/45 |
| 299,127 | A | * | 5/1884 | Garrigus | ................... F03D 3/00 |
| | | | | | 415/145 |
| 3,556,239 | A | * | 1/1971 | Spahn | ......................... 180/65.25 |
| 3,876,925 | A | * | 4/1975 | Stoeckert | ........................... 322/1 |
| 4,075,545 | A | * | 2/1978 | Haberer | ........................... 322/35 |
| 4,168,759 | A | * | 9/1979 | Hull et al. | ........................ 180/2.2 |
| 4,254,843 | A | * | 3/1981 | Han et al. | ...................... 180/165 |
| 4,398,096 | A | * | 8/1983 | Faurholtz | ................... F03D 1/04 |
| | | | | | 290/55 |

(Continued)

*Primary Examiner* — Pedro J Cuevas
(74) *Attorney, Agent, or Firm* — Lewis Roca Rothgerber Christie LLP

(57) ABSTRACT

A wind turbine is disclosed which uses energy in air moving relatively toward the turbine to focus and increase the velocity of air entering a turbine inlet air flow passage. The inlet flow passage discharges focused and accelerated air to blades of a rotor where the blades interact with that air to turn the rotor. Rotor motion can be used to operate an electrical generator. The plane of rotation of the rotor can be at substantially right angles to the plane of the passage inlet opening. Baffles in the flow passage and stator vanes adjacent the rotor blades cause the mass flow of the accelerated air to be substantially uniform, and desirably directed, throughout the rotor's blade area. The turbine is compact and operates quietly.

20 Claims, 9 Drawing Sheets

(56) References Cited

U.S. PATENT DOCUMENTS

| | | | |
|---|---|---|---|
| 4,423,368 A * | 12/1983 | Bussiere | 322/35 |
| 4,433,544 A * | 2/1984 | Wells | F03D 9/007 290/55 |
| 4,452,046 A * | 6/1984 | Valentin | F03D 1/04 290/55 |
| 4,508,973 A * | 4/1985 | Payne | 290/55 |
| 4,801,811 A * | 1/1989 | Assaf | F03D 1/04 290/55 |
| 5,280,827 A * | 1/1994 | Taylor et al. | 180/165 |
| 5,394,016 A * | 2/1995 | Hickey | 290/55 |
| 5,680,032 A * | 10/1997 | Pena | 290/52 |
| 5,998,882 A * | 12/1999 | Alston | 290/54 |
| 6,177,735 B1 * | 1/2001 | Chapman et al. | 290/44 |
| 6,373,145 B1 * | 4/2002 | Hamrick | 290/44 |
| 6,417,578 B1 * | 7/2002 | Chapman et al. | 290/44 |
| 6,717,285 B2 * | 4/2004 | Ferraro | F03D 1/04 244/53 B |
| 6,765,309 B2 * | 7/2004 | Tallal et al. | 290/55 |
| 6,857,492 B1 * | 2/2005 | Liskey et al. | 180/165 |
| 6,877,948 B2 * | 4/2005 | Cutcher | 415/4.4 |
| 7,112,034 B2 * | 9/2006 | Bezemer | 415/3.1 |
| 7,365,448 B2 * | 4/2008 | Stephens | 290/55 |
| 7,445,064 B2 * | 11/2008 | Kim | 180/2.2 |
| 7,488,150 B2 * | 2/2009 | Krippene | 415/4.2 |
| 7,665,554 B1 * | 2/2010 | Walsh | 180/2.2 |
| 7,753,644 B2 * | 7/2010 | Krippene | 415/4.2 |
| 8,063,502 B1 * | 11/2011 | Voyles | 290/55 |
| 8,197,178 B1 * | 6/2012 | Chen | 415/4.1 |
| 8,353,667 B2 * | 1/2013 | Hoffmann | 416/37 |
| 8,434,574 B1 * | 5/2013 | York et al. | 180/2.2 |
| 9,453,494 B2 * | 9/2016 | Krippene | F03D 9/39 |
| 2007/0126240 A1 * | 6/2007 | Richards et al. | 290/55 |
| 2007/0231118 A1 * | 10/2007 | Krippene | 415/4.2 |
| 2009/0155043 A1 * | 6/2009 | Krippene | 415/4.2 |
| 2009/0280008 A1 * | 11/2009 | Brock | 415/208.2 |
| 2009/0280009 A1 * | 11/2009 | Brock | 415/208.2 |
| 2010/0054939 A1 * | 3/2010 | Hoffmann | 416/10 |
| 2010/0244453 A1 * | 9/2010 | Dornan | F03D 9/00 290/55 |
| 2011/0037261 A1 * | 2/2011 | Champ et al. | 290/44 |
| 2016/0084227 A1 * | 3/2016 | Krippene | F03D 9/39 290/55 |

\* cited by examiner

LOW-PROFILE POWER-GENERATING WIND TURBINE

CROSS-REFERENCE TO REFERENCE TO RELATED APPLICATION

This application is a continuation of pending U.S. patent application Ser. No. 13/009,735, filed Jan. 19, 2011, entitled LOW-PROFILE POWER-GENERATING WIND TURBINE, which claims priority to and the benefit of U.S. Provisional Application No. 61/296,280, filed Jan. 19, 2010, the entire contents of which are incorporated herein by reference.

FIELD OF THE INVENTION

This invention pertains to wind turbines which have low profiles, which are quiet when operating, and which can be used for generating electrical power. More particularly, the invention pertains to such wind turbines which collect ambient wind air and concentrate and direct that air to and through a radially-bladed rotor at a throat of a turbine air inlet passage.

BACKGROUND

It is known to generate electrical power by use of wind-powered mechanisms. Known mechanisms for such purposes generally are of two kinds, namely, wind turbines which commonly have rotors resembling aircraft propellers which rotate about horizontal axes, and vertical axis wind turbines which commonly have long vertically extending blades as components of a cylindrical rotor. The rotors of those two kinds of wind turbines are connected to rotatable shafts which are suitably connected to generators which output electrical power. The generators commonly produce DC power which commonly is converted to AC power of a desired frequency, such as by use of inverters.

Both of those kinds of wind turbines, with possible rare exception, have fixed locations. Also, both of those kinds of wind turbines have considerable height. The generators of horizontal axis wind turbines are enclosed in housings (commonly called "nacelles") located atop towers of sufficient height to provide suitable clearance between the ground and the ends of the rotor blades which extend radially in a common vertical plane from a central hub on the horizontal rotational axis of the rotor. Horizontal axis wind turbines having overall heights well in excess of 120 meters are in use.

Such horizontal and vertical axis turbines share a common attribute, namely, their rotors are exposed to, and perform in direct response to, ambient wind conditions. For that reason, local winds must have speeds greater than a characteristic minimum speed before the turbines rotate sufficiently rapidly, or with sufficient power (torque), to produce useful generator output.

The requirement of such known wind turbines that they have fixed locations is a disadvantageous limitation of them. Also, their considerable-to-large height limits the places where they can be used safely or without objection to their appearance.

SUMMARY

This invention provides a wind-driven power generation turbine which differs significantly in concept and structural arrangement from the horizontal axis and vertical axis wind turbines reviewed above. Turbines according to this invention can be of small height and can be portable. Their small height enables them to be used on buildings in urban areas, e.g.; when portable, they can be used for such times as are needed in different locations, such as in support of construction activities or in support of military operations, as examples of utility. The present wind turbines are quiet in operation and are easily accessible for maintenance. They can be provided in a wide range of sizes and power generation capabilities.

Generally speaking in terms of structure, this invention provides a wind turbine having an ambient air flow inlet passage which extends between inlet and outlet ends. Between those ends, the passage has a selected effective length and configuration. The inlet end has an inlet opening of relatively large area compared to a passage outlet opening at the passage's outlet end. Between its ends, the passage configuration includes a decrease in the passage cross-sectioned area. A rotor is located proximate to the passage outlet opening. The rotor is rotatable about an axis which is substantially aligned with a rear portion of the length of the passage which terminates at the outlet opening. The rotor includes an array of radially extending blades which are spaced regularly about the rotor axis. The blades can interact with air moving through the passage outlet opening to produce rotation of the rotor about its axis.

Generally speaking in terms of procedure, this invention provides a method for generating electrical power from wind energy. The method includes providing an electrical generator, a rotor and an air flow passage. The rotor carries an array of blades defined to interact with air moving past them to produce rotation of the rotor. The air flow passage has a relatively large effective inlet opening area and a relatively small outlet opening area. The inlet and outlet openings are spaced along the passage which decreases in cross-sectional area between those openings. The method includes positioning the rotor sufficiently close to the passage outlet opening that air moving through the outlet opening can effectively interact with the rotor blades to produce rotation of the rotor. Another procedural step of the method is coupling the generator to the rotor so that the generator operates to generate electrical energy in response to rotation of the rotor. Another step of the method is orienting the passage so that the inlet opening faces into the direction from which ambient air moves relatively toward the inlet opening.

As air moves relatively toward the passage inlet opening, the air enters into the inlet passage and moves along the passage to the outlet opening and the rotor. The decreasing cross-sectional area of the passage causes the velocity of the air in the passage to increase as it moves along the passage. As a result, the air interacting with the rotor blades is more energetic per unit of volume than the air which enters the passage. The increased velocity of the air interacting with the rotor blades is significant because the power available in moving air (wind) is proportioned to the cube of the air velocity.

DESCRIPTION OF THE DRAWINGS

The design principles, some presently preferred structural arrangements of turbines according to this invention, and the procedural affects of the invention are depicted in the drawings which accompany and illustrate the description which follows. Those illustrations are comprised by figures as follows.

DETAILED DESCRIPTION

Figure 1:
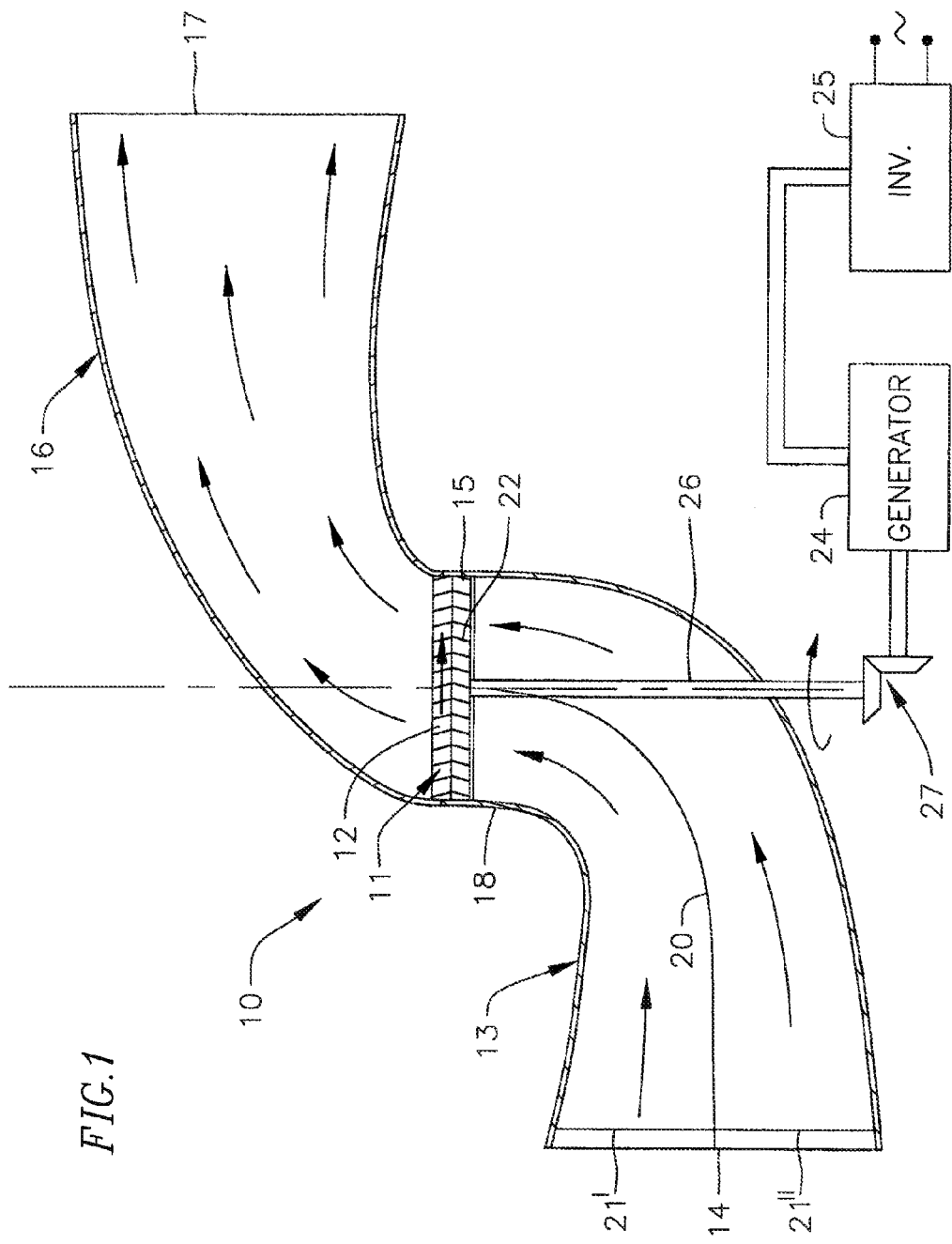
FIG. 1 is a drawing presenting a simplified schematic depiction of a turbine the invention to illustrate certain principles of the invention.

FIG. 1 is presented to illustrate principles of the operation and structure of a wind turbine according to this invention. FIG. 1 shows a low-profile power-generating wind turbine 10 in simplified and somewhat idealized form. The turbine includes a round rotor 11 which carries around its circumference a plurality of regularly spaced radially extending blades 12 of desired length and shape. The rotor is positioned for rotation in a plane which is substantially parallel to an outlet end 15 an inlet air flow passage 13 which has an inlet end 14 spaced in an upstream direction along the inlet passage from the rotor. An optional outlet air flow passage 16 can have an outlet end 17 spaced in a downstream direction from the rotor.

The portion 18 of the inlet passage 13 closely adjacent the rotor on its upstream side preferably is straight, of substantially constant diameter, and aligned with the rotor axis of rotation; that portion of the passage defines a passage throat. Passage 13 between inlets 14 and throat 18 is defined to decrease, preferably substantially smoothly in cross-sectional area proceeding from the inlet to the throat. During times of its operation to generate electrical power, the turbine is oriented so that the opening at inlet end 14 of passage 13 faces into the direction from which air (actual or relative wind) moves toward the turbine. The rearwardly tapering shape of the air inlet passage cooperates with air entering the inlet and moving along the passage to cause that air to increase in velocity as the air moves along the passage. As a result, the air in passage 13 at the upstream side of rotor 11 is more energetic per unit volume of air than is the air just moving into the passage inlet. Therefore, the air entering the spaces between the rotor blades moves faster and can act more forcefully on the rotor blades than can a comparable volume of the air just moving into the passage inlet.

The focused and accelerated nature of the air which acts on the rotor of a wind turbine according to this invention distinguishes such a turbine from wind turbines of the kinds reviewed above in which wind merely blows on the turbine rotor and does not undergo significant velocity increasing and focusing processes before interacting with the turbine rotor.

After passage through rotor 11, air flowing through turbine 10 either exits from the turbine or enters outlet passage 16 which, if present, extends between rotor 11 and outlet 17. An air outlet passage 16 can increase in cross-sectioned area from the area of throat 86 to the area of the outlet opening of outlet passage which can have substantially the same area as the inlet opening to the turbine. Air outlet passage 16 can enable air in it to expand and reduce velocity progressively so that the velocity and pressure of air leaving the turbine is substantially equal to the pressure and velocity of air entering the turbine. However, it has been found that a turbine according to this invention which does not include an air outlet passage is effective and may be preferred, especially where low overall height is a desired property of the turbine.

The foregoing description of inlet air flow passage 13 and of its different portions, apart from mention of rotor 11, is consistent with the description of a straight venturi tube. It is within the scope of this invention that passage 13 can be straight along its length. However, to make turbine 10 more compact end-to-end, and for other reasons discussed or made apparent later herein, it is preferred, when implementing the principles of the invention, to form passage 13 so that its throat 18 is substantially vertical relative to a substantially horizontal portion of the passage adjacent inlet end 14. FIG. 1 shows such a passage configuration, referred to here as a "right turn passage" or RTP. It is envisioned that the bend in an inlet air passage in a turbine of the invention can be greater than a 90E bend.

If a turbine inlet air flow passage is straight to and through the rotor, the velocity and mass flow rate of air passing through the rotor normally will be substantially uniform at different locations around the periphery of the rotor where the rotor blades are located. That is a desirable condition. On the other hand, if there is a bend in the turbine inlet air flow passage upstream of the rotor, the fact that air has mass can cause the mass distribution of air at the rotor to be non-uniform; a larger share of the mass of the air at the rotor likely will be found in that part of the passage throat which corresponds to the outside of the passage bend. To counteract and control such unbalancing of air distribution in a turbine having a right turn passage as shown in FIG. 1, turbine 10 preferably includes a primary partition or baffle 20 extending in the passage from just forwardly of the rotor blades toward the passage inlet. Partition 20 preferably is positioned and contoured, in cooperation with the contours of the passage inlet portion so that substantially equal fractions of the overall quantity of air entering inlet 14 flow to the forward and rear halves of the annular area of the rotor in which the rotor blades 12 are located; see FIG. 2 and remarks which follow. The positioning and contouring of the primary partition between its front extent and its rear end adjacent the rotor preferably is defined so that each half of passage 13 (the half leading to the front of the rotor and the half leading to the rear of the rotor) have substantially equal effects to increase the velocity of the air moving from inlet 14 to the rotor location.

As shown in FIG. 1, primary partition 20 preferably is generally horizontally disposed in passage 13 at its upstream end. The air moving in the passage above partition 20 constitutes an upper air stream which is directed to the forward portion of rotor 11, and the air moving in the passage below partition 20 constitutes a lower air stream which is directed to the rear portion of the rotor. Each of the upper and lower air streams can be, and preferably are, substantially equally subdivided by one or more secondary partitions 21 composed of upper-forward secondary partitions 21' and of lower-rear secondary partitions 21". As with the primary partition 20, the arrangement of the secondary partitions is defined within passage 13 so that the air in each subdivision of the upper and lower air streams moving toward rotor 12 undergoes substantially equal velocity increasing effects. As a result, all the rotor blades 12 encounter substantially the same conditions of air velocity and mass distribution. The number of secondary partitions 21 provided in a turbine 10 can be varied with the size of the turbine; 4 or 5 secondary partitions 21' and 21" can be appropriate in a turbine having a large diameter rotor.

Figure 5:
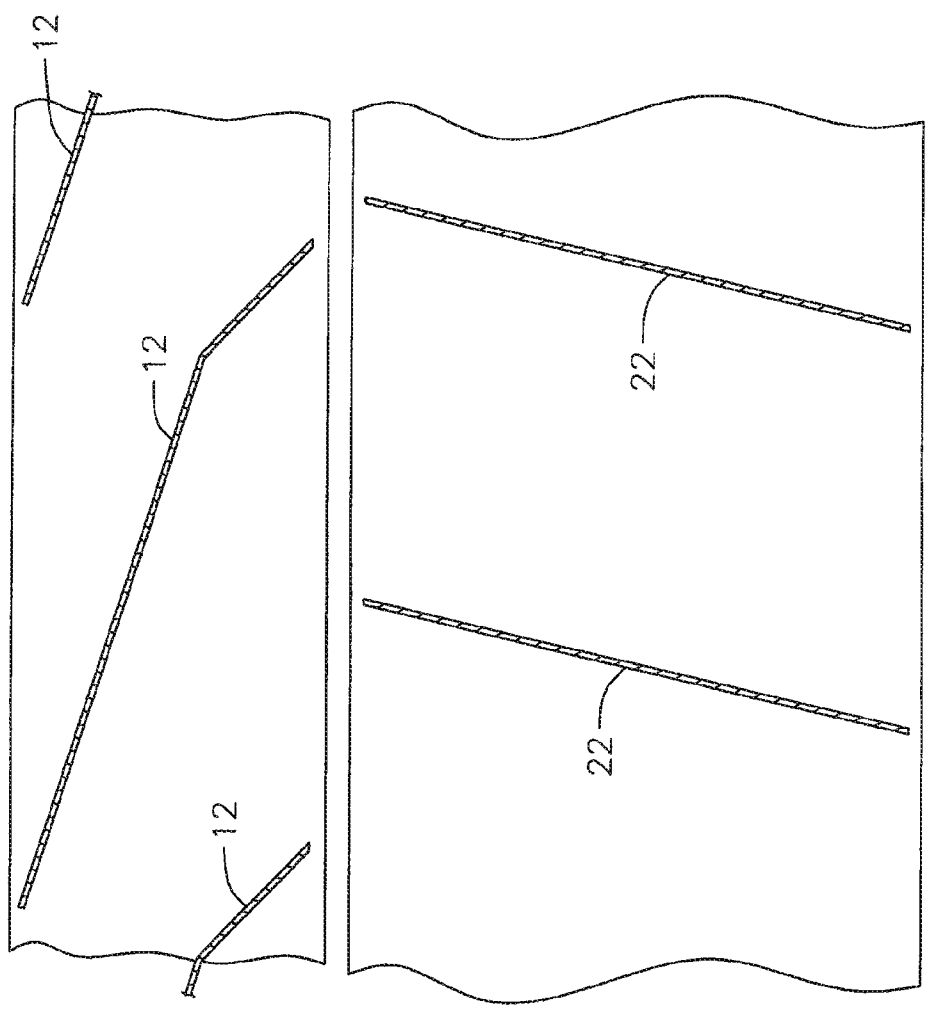
FIG. 5 is an enlarged fragmentary cross-section view of the stator vanes and rotor blades in a turbine of the invention.

As shown in FIGS. 1 and 5, turbine 13, particularly in the case where it has a right turn inlet air flow passage, can include a set of regularly spaced fixed stator vanes 22 immediately in front of the rotor blades 12. The stator vanes coact with air moving past them so that the direction of movement of air leaving the vanes has a desired direction relative to the shapes of the rotor blades. The effect of the stator vanes is to enable the rotor blades to more efficiently and effectively respond to the forces applied to the rotor blades by the passing air to turn rotor 11 more forcefully in the desired direction of the rotor. The stator vanes preferably extend radially of the turbine axis and can be supported between inner and outer supportive cylindrical shrouds which are fixed relative to a foundation or base for the turbine; see FIG. 7. The inner stator vane shroud support can extend inwardly from that shroud adjacent the rotor; if that shroud support is located below the rotor, as where air moves upwardly through the passage throat 16, that shroud support can provide at least some support for rotation of the rotor relative to it about the turbine axis. Also, it will be apparent that, if desired, the turbine can be a multi-stage turbine in which at least one further group of stator vanes and rotor blades are located downstream adjacent to the first group of vanes and blades encountered by air as it moves through throat 18.

Rotation of turbine rotor 11 is used to turn the rotor of a generator 24 thereby to produce electrical power which can be used directly from the generator. If the generator is a DC generator and AC power is desired for use, the output of the generator can be applied to an inverter 25. In implementations of this invention which use right turn inlet air flow passages to enable the turbine rotor to turn about a vertical axis, the rotor can be connected to the upper end of a rotatable output shaft 26 which can extend downwardly from the rotor. The lower end of shaft 26 can be connected directly to the generator. More preferably, however, the turbine output shaft is coupled to the generator through a right angle drive 27 which can have an effective gear ratio different from (preferably greater than) 1:1. If the rotor shaft and the generator input shaft are to be aligned, a planetary gear arrangement can be used to couple the two shafts.

In addition to the use of bearings which support rotor shaft 26 for rotation in the turbine, it is desirable also to use thrust bearings to support the rotor shaft. Thrust bearings which are effective in opposite directions are desirable since air moving through the rotor can apply sufficient force on those blades to move the rotor and its shaft in the direction of the air flow.

Figure 2:
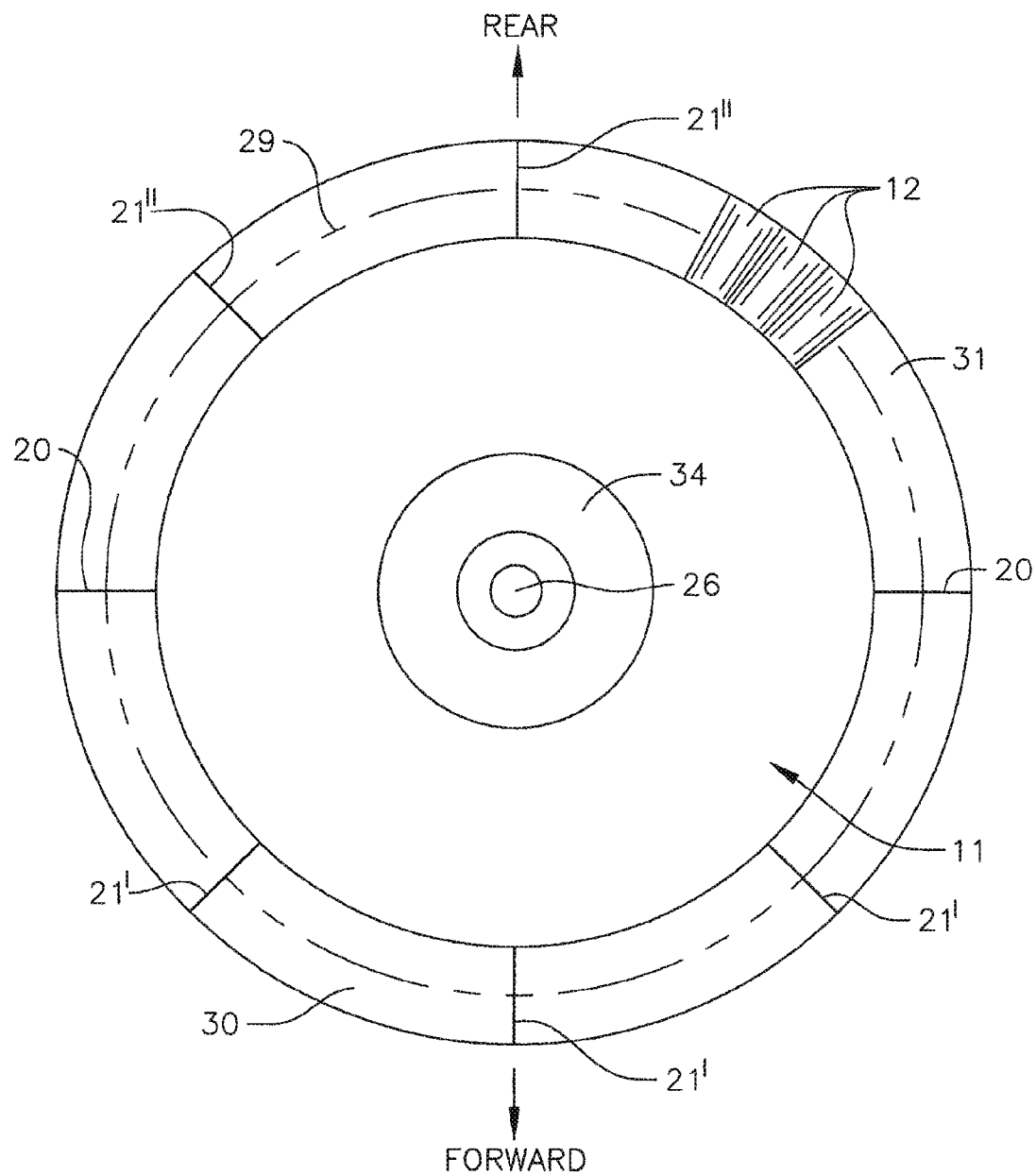
FIG. 2 is a drawing which shows a top view of the turbine rotor.

FIG. 2 is a fragmentary plan view of a rotor 11 useful in a turbine 10 having a right turn inlet air flow passage through the throat of which air moves in an upward direction. Broken line 27 is present in FIG. 2 to denote that rotor blades 12 (only three of which are shown) are present around the entire periphery of the rotor. Forward and rear directions in the turbine are indicated. FIG. 2 shows the locations where the upper end of primary passage partition 20 terminates relative to the rotor to define forward 30 and rear 31 equal-area semicircular arcuate zones through which the rotor blades pass as the rotor turns. FIG. 2 also shows the locations relative to zones 30 and 31 of the upper rear ends of secondary partitions 21' and 21." That is, the air which moves along passage 13 above partition 20 passes through throat 18 to the stator vanes and rotor blades through ducting discharge openings having substantially the same collective shape as zone 30 shown in FIG. 2. Similarly, the air which moves along passage 13 below partition 20 approaches the stator vanes and rotor blades through ducting discharge openings having substantially the same collective shape as zone 31 in FIG. 2. Together, those ducting discharge openings form a circle below the stator vanes. That circle can form the boundary of a substantially circularly cylindrical space inside the turbine around which the inner-front and lower-rear halves of passage inlet portion pass. Rotor shaft 26, generator 24, inverter 25, and related elements of the coupling of the rotor to the generator can be located in that cylindrical space. The floor of that space can be mounted on a foundation for the turbine or can be a part of such a foundation. That space can have its own enclosure 33 (see FIG. 8) separate from the structure defining air flow passage 13.

FIG. 2 also shows that rotor 11 can have a central hub 34 to which the upper end of shaft 26 can be secured in alignment with the rotational axis of the rotor.

Figure 3:
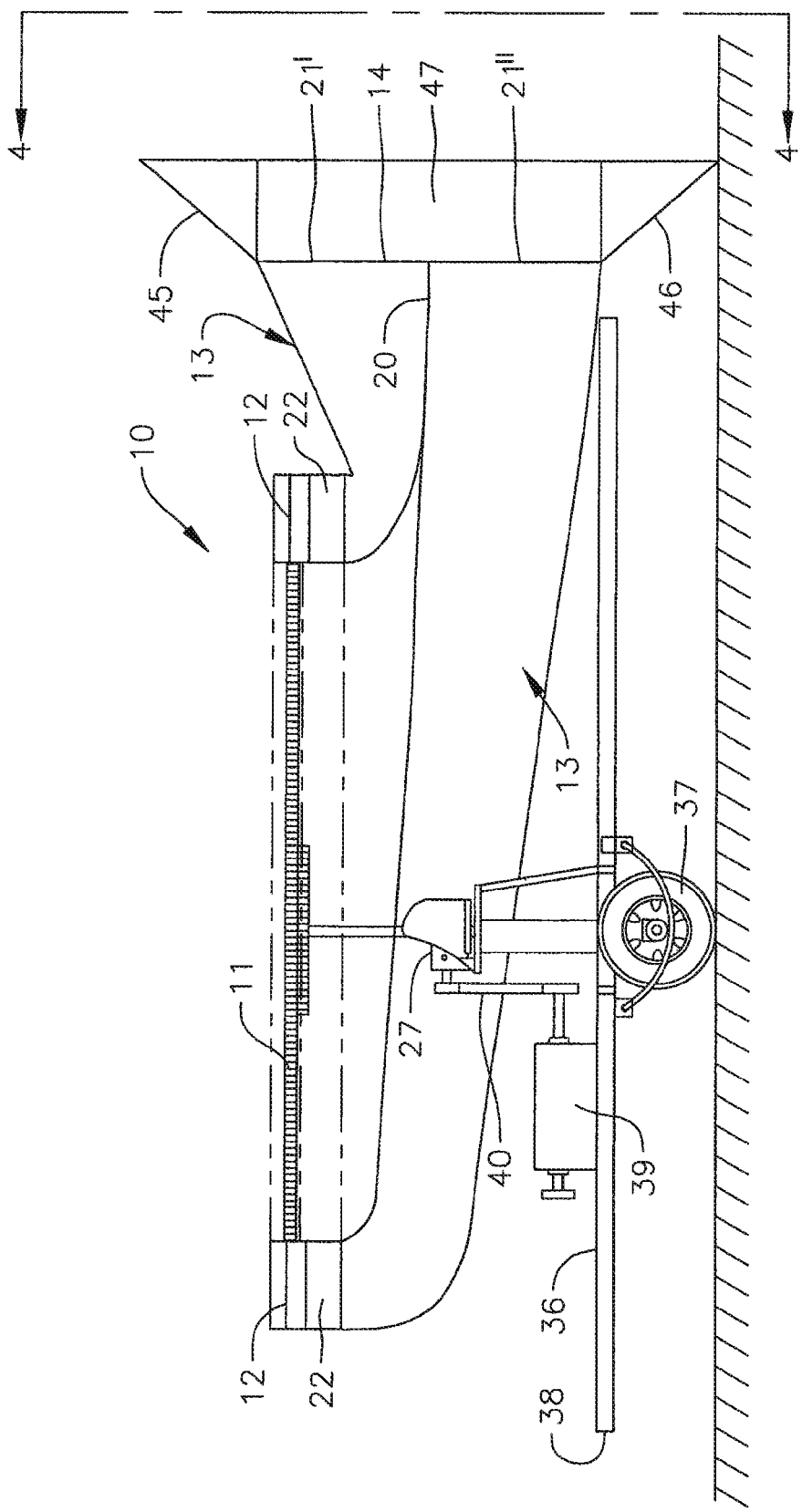
FIG. 3 is a drawing showing a longitudinal cross-sectional elevation view of a turbine of the invention supported on a wheeled foundation.

FIG. 3 shows that the foundation on which the turbine can be supported can be a trailer frame 36 (such as a frame similar to a frame for a boat trailer) having an axle and wheels 37. The front end of the trailer is indicated at 38. FIG. 3 also shows that the output of a right angle drive 27 powered by rotor shaft 26 can be coupled to a gearbox 39 by a belt 40.

Figure 4:
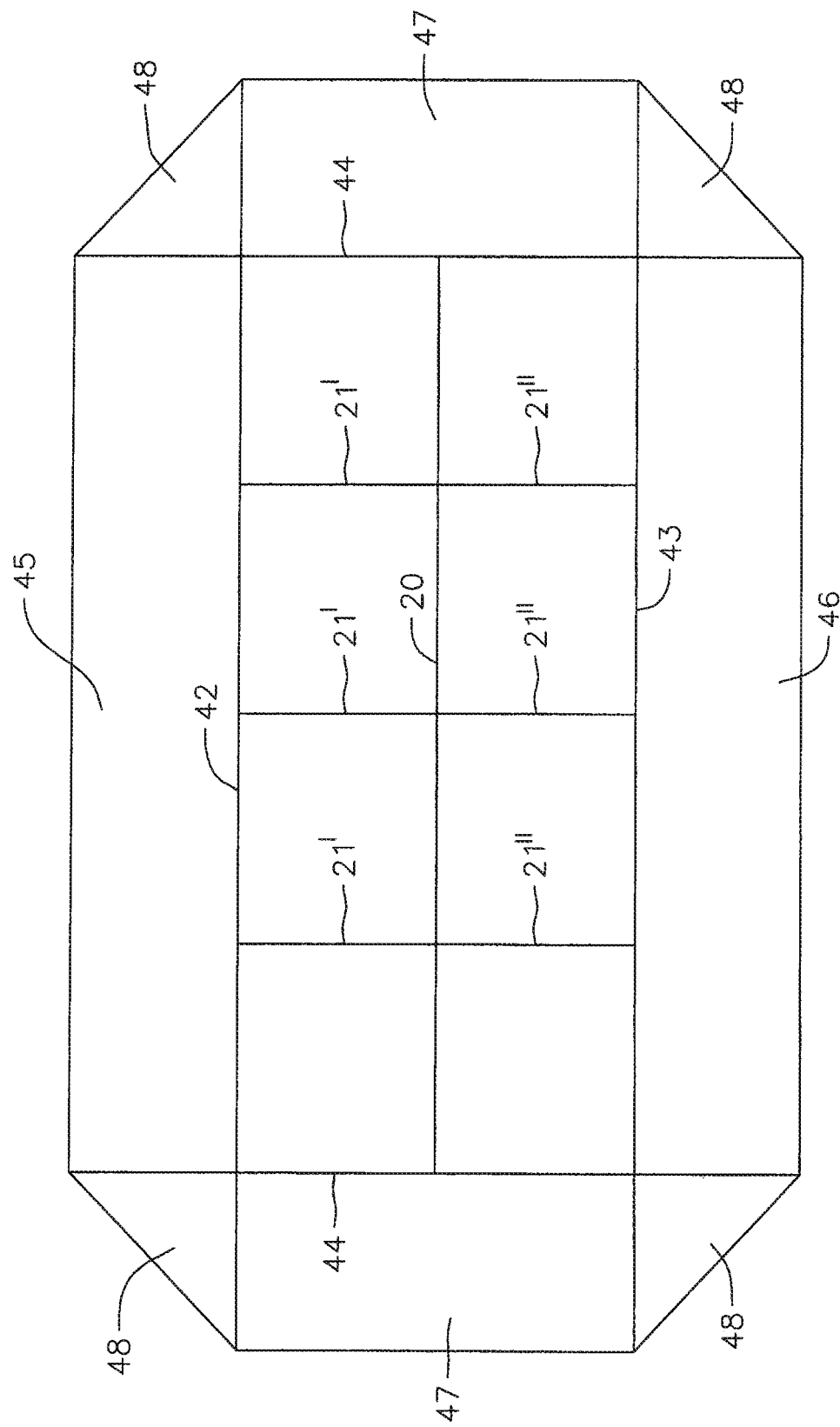
FIG. 4 is an elevation view of the inlet (front) end of the turbine shown in FIG. 3 as taken along line 4-4 in FIG. 3.

FIGS. 3 and 4 show that the effective area of the inlet opening to inlet air flow passage 13 can be enlarged by auxiliary structures movably mounted to the passage structure around the inlet opening. In FIG. 4, the fixed structure of the passage defines top 42, bottom 43, and side 44 edges of the opening. Since turbine 10 is shown in FIG. 3 to be carried on a movable vehicle, it can be useful to close the opening to passage 13 when the vehicle is in motion as well as, perhaps, other times when the turbine is not in use. To that end, turbine 10 can be equipped with doors for selective closure of the passage inlet opening. Such doors can be upper and lower doors 45 and 46 which can be hinged to the top and bottom edges, respectively, of the passage inlet opening. Doors 45 and 46 can extend along the full width of the inlet opening. Doors 45 and 46 can be supplemented by movable (hinged) side panels 47 mounted to the side edges 44 of the passage inlet opening; the side panels, when disposed substantially in the plane of the outlet opening, extend along the height of the inlet opening but preferably only partially across the width of the opening. When the inlet opening is to be closed, the doors and side panels can be moved to closed positions substantially in the plane of the outlet opening with the side panels overlapped by the doors.

During times when it is desired to operate the turbine, the doors and panels can be opened and moved to defined air capture positions in which they are disposed at angles to the plane of the passage inlet opening. In FIG. 3, doors 45 and 46 are shown to have been moved about 135E from their closed positions, and the side panels can have been moved through similar angles; the doors and side panels are suitably held in their open positions. FIG. 4 shows that the spaces between adjacent edges of the opened doors and side panels can be closed by gusset elements 48. The gussets can be defined by suitably shaped (such as triangular) pieces of canvas, e.g., and can be secured, as by grommets and pins, to the adjacent edges of the doors and side panels. The arrangement of open doors and side panels, and installed gussets, around the fixed boundaries of the passage inlet opening significantly increases the effective area of the passage inlet opening.

FIGS. 3 and 4 depict the use of doors 45 and 46 which each close one-half the area bounded by the opening top, bottom and side edges 45-47. If desired, doors dimensioned at the full height of that opening can be provided; such full-height doors can be disposed in overlying relation to each other when they are closed.

FIG. 5 depicts a workable relation between rotor blades 12 and stator vanes 22. Preferably, as shown, there is a space between the upper edges of the stator vanes and the adjacent lower edges of the rotor blades. That space is useful to the desired quiet operation of a turbine according to the invention.

Figure 6:
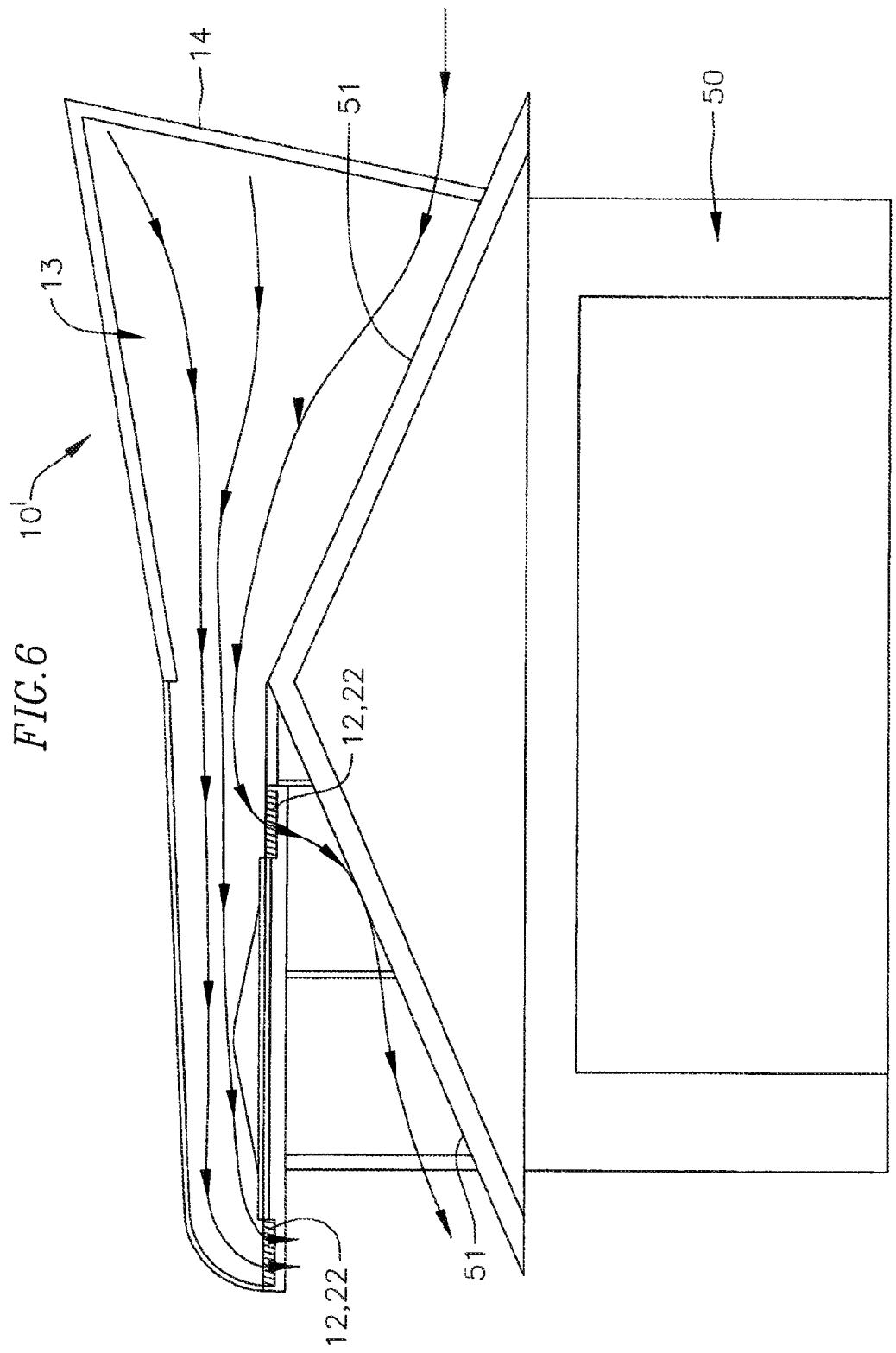
FIG. 6 is an elevation view, partially in cross-section, which shows how a turbine of the invention can be located on a building having a pitched roof.

FIG. 6 shows that a turbine 10' according to this invention which includes a right turn inlet air flow passage can have its passage inlet 14 located above its outlet so that air flows downwardly through stator vanes 22 and rotor blades 12. Turbine 10' can have advantages in uses where blowing snow, or other particulate matter moving along or close to the ground, may be encountered. Further, FIG. 6 shows that turbine 10' can be supported atop a building 50 having a pitched roof 51 in which the roof surfaces form boundaries of air inlet and air outlet passages of the turbine.

If a turbine according to this invention is supported on a movable foundation, such as a trailer as shown in FIG. 3, the turbine can readily be positioned on the ground so that the inlet 14 of the turbine inlet air flow passage faces directly into an oncoming wind; if the wind shifts appreciably in direction, the turbine can be repositioned or reoriented as needed. However, this invention contemplates turbines having such large diameter rotors that reorientation of the turbine foundation is not practical, as well as turbines located atop buildings where access to the turbine for reorientation of the turbine is not workable or realistically possible. In the latter situations, the turbines may be self-orienting on their foundations; an illustration of a self-orienting turbine 10" is found in FIG. 8. The air flow passage 13 of turbine 10" and the structure in it can be as described above. The inlet air flow passage 13 of that turbine can be supported on a base 55 which, in turn, can be movably supported, as by rollers 56, on a stationary foundation 57 such as a rooftop or the ground. The turbine preferably is so mounted on the base that the turbine axis (i.e., the axis of rotation of the turbine rotor) and the axis of rotation of the base are coincident at 58. As noted above, the rotor drive shaft and related power generation equipment can be located in a round housing 33 aligned with axis 58 separate from the structure forming air flow passage 13. The inlet air flow passage structure can be movable around housing 33, and so housing 33 can be supported on foundation 57 and can extend through a central hole in base 55. In some instances, air flow passage structures of turbine 10" can be self-orienting since the outlet air flow passage structure, if present can function in a manner akin to the tail of a weathervane; wind forces acting in the outside of the turbine can turn the turbine about axis 58. In other instances, such as where the turbine rotor diameter is large, the turbine base 40 can be rotated by a suitable base drive mechanism 59 (denoted as a yaw drive), such as a motor driven pinion gear engaged with a ring gear carried by the base; see FIG. 8. Operation of the base drive mechanism can be controlled using information obtained from a wind direction sensor 60 suitably positioned on or associated with the turbine.

Figure 8:
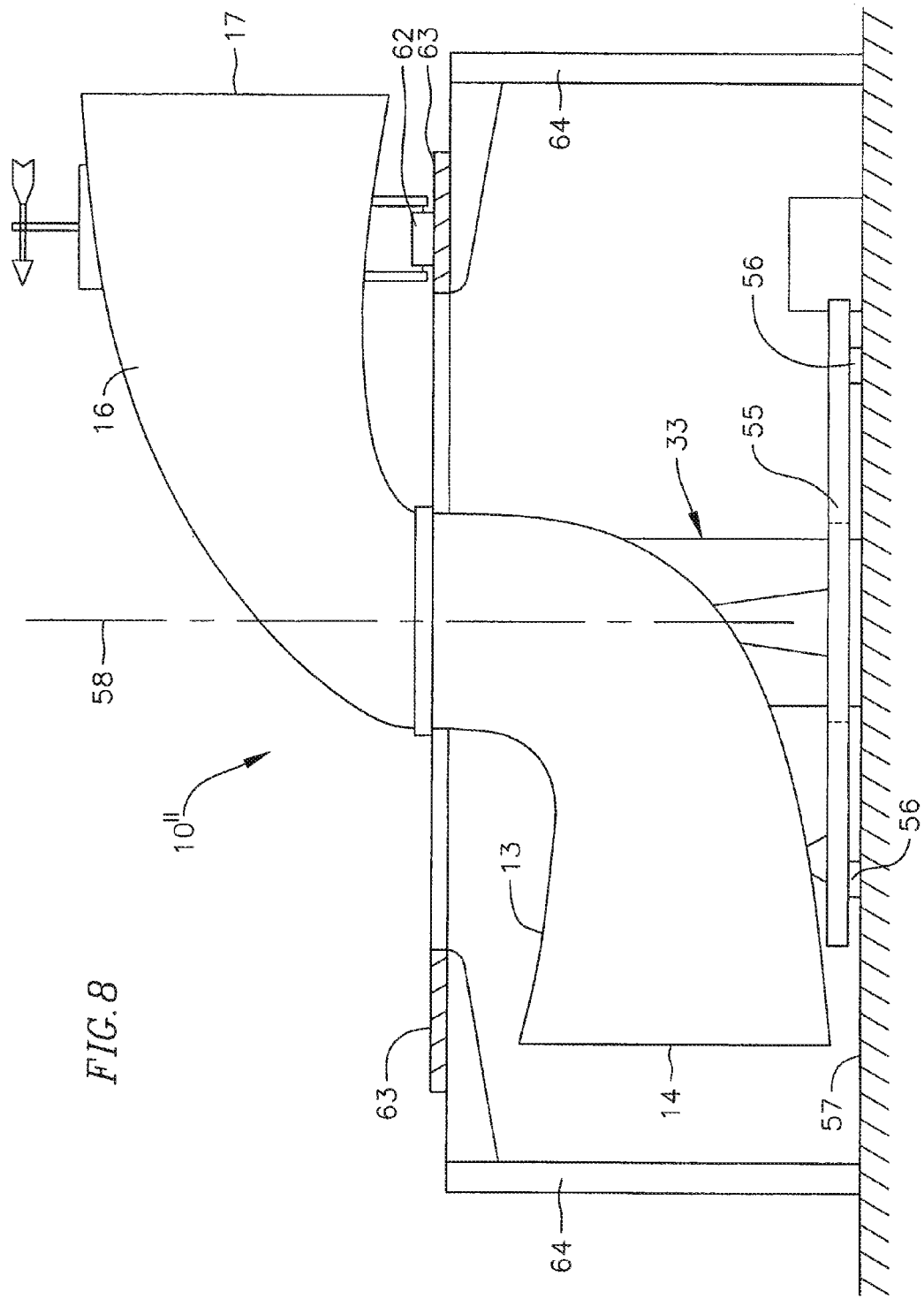
FIG. 8 is a drawing showing how a turbine according to the invention, located at a fixed location, can be adjusted in position to face into the direction of an ambient wind.

If a self-orienting turbine is large, it can be useful to provide movable support for the portion of the airflow passage structure which, if present, is located above the top of the inlet air flow passage throat. Such support is shown in FIG. 8 where the outlet portion 16 of the turbine air flow passage structure is located above the passage throat. More specifically, passage outlet portion 19 can be movably supported, as by a roller 62 connected to the lower exterior of that passage portion, on an annular platform 63 disposed perpendicular to axis 58 and preferably located suitably above foundation 57. Platform 63 can be carried on supports 64 which preferably are located in a circular pattern concentric to axis 58. The diameter of the pattern of supports 64 is sufficiently large that the turbine can be rotated 360° about axis 58 inside the platform supports.

Figure 7:
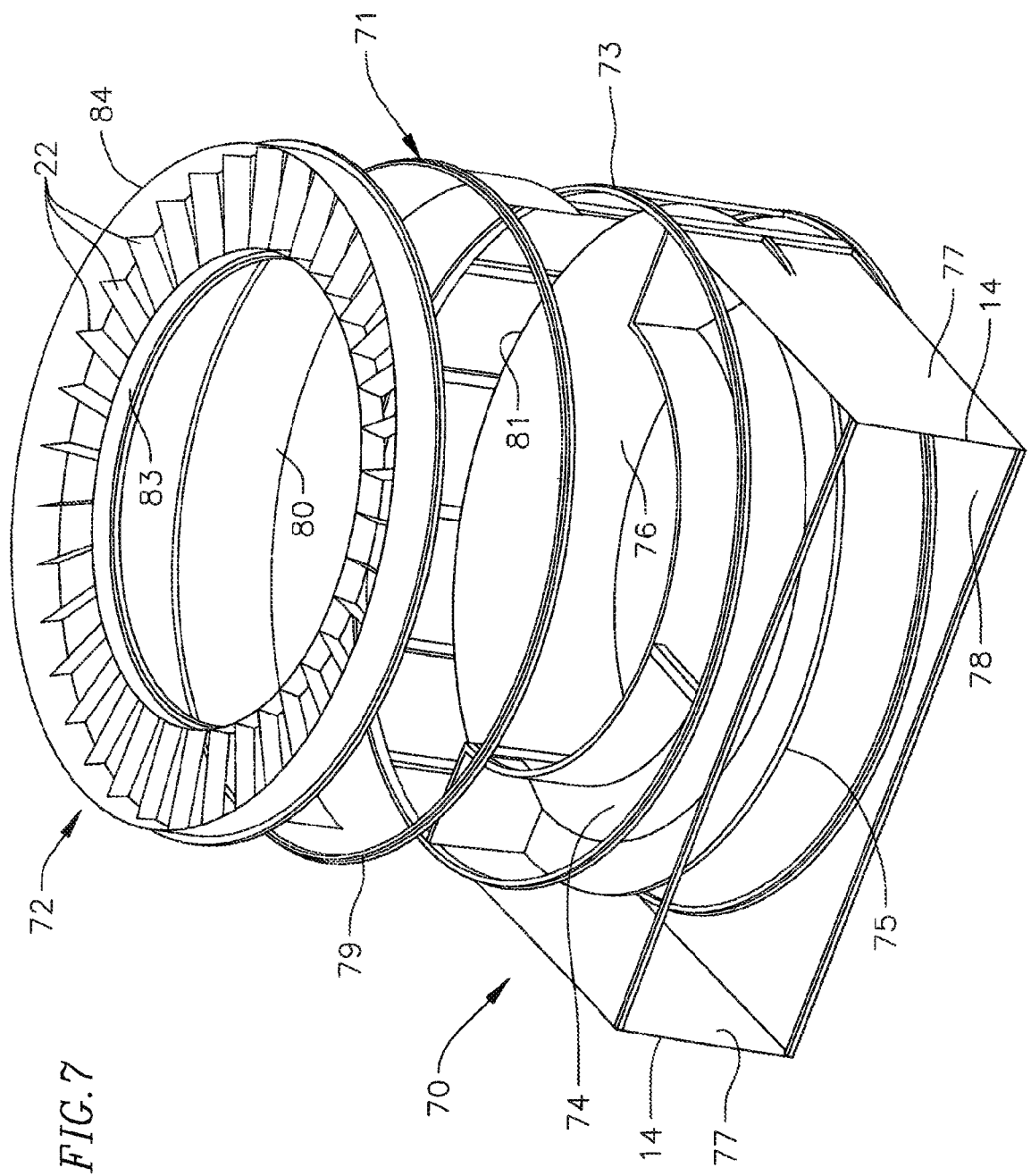
FIG. 7 is an exploded perspective view showing how the turbine air inlet passage and a stator vane array can be defined.

FIG. 7 is an exploded perspective view of structural components useful to define aspects of an inlet air flow passage of a turbine of this invention. The depicted components are a bottom passage subassembly 70, a top passage subassembly 71, and a stator subassembly 72. Subassembly 70 defines a circular structural framework 73 having a height which approximates the distance between a turbine base plane and its rotor plane. In the upper forward half of the framework 73 is located a semicircular air deflector 74 which forms surfaces of an upper inlet air flow passage and to which the rear extent of principal air flow partition 20 can be connected at lower deflector edge 75. As illustrated in FIG. 7, the air deflector 74, which defines the upper inlet air flow passage, includes a semi-annular horizontal wall, a semi-conical wall extending upward and rearward from a rear edge of the semi-annular horizontal wall, a semi-cylindrical wall extending upward from a rear edge of the semi-conical wall, and a pair of vertical wall segments extending radially outward from respective opposite ends of the semi-cylindrical wall. A lower semicircular air deflector 76 is carried in the lower half of subassembly 70 at its rear. Deflector 76 can be shaped as one-half of a right circular conic section; it is concave upwardly. Air moving to deflector 76 passes below deflector 74. The upper edge of deflector 76 is shown to be at the mid-height of framework 73. The forward portion of subassembly 70 can be closed on its sides (as at 77), its bottom (as at 78), and its top (not shown) to define other aspects of inlet air flow passage 13 rearwardly of its rectangular open inlet end 14.

Subassembly 71 is shown to be comprised principally by a circular structural ring member 79 and by a semicircular cylindrically curved skirt 80 which depends from ring member 79 a distance equal to the spacing of the upper edge 81 of lower deflector 76. When ring member 79 is properly positioned on and secured to the upper structural ring of subassembly 70, skirt 80 connects to deflector 76 at its edge 81 and closes the upper rear half of framework 73.

Stator assembly 72 includes stator vanes 22 which are carried between inner 83 and outer 84 circularly cylindrical vane supporting shrouds. The stator assembly preferably is annular in shape. The stator assembly is connected to ring member 79 of subassembly 71 as the turbine is assembled.

Figure 9:
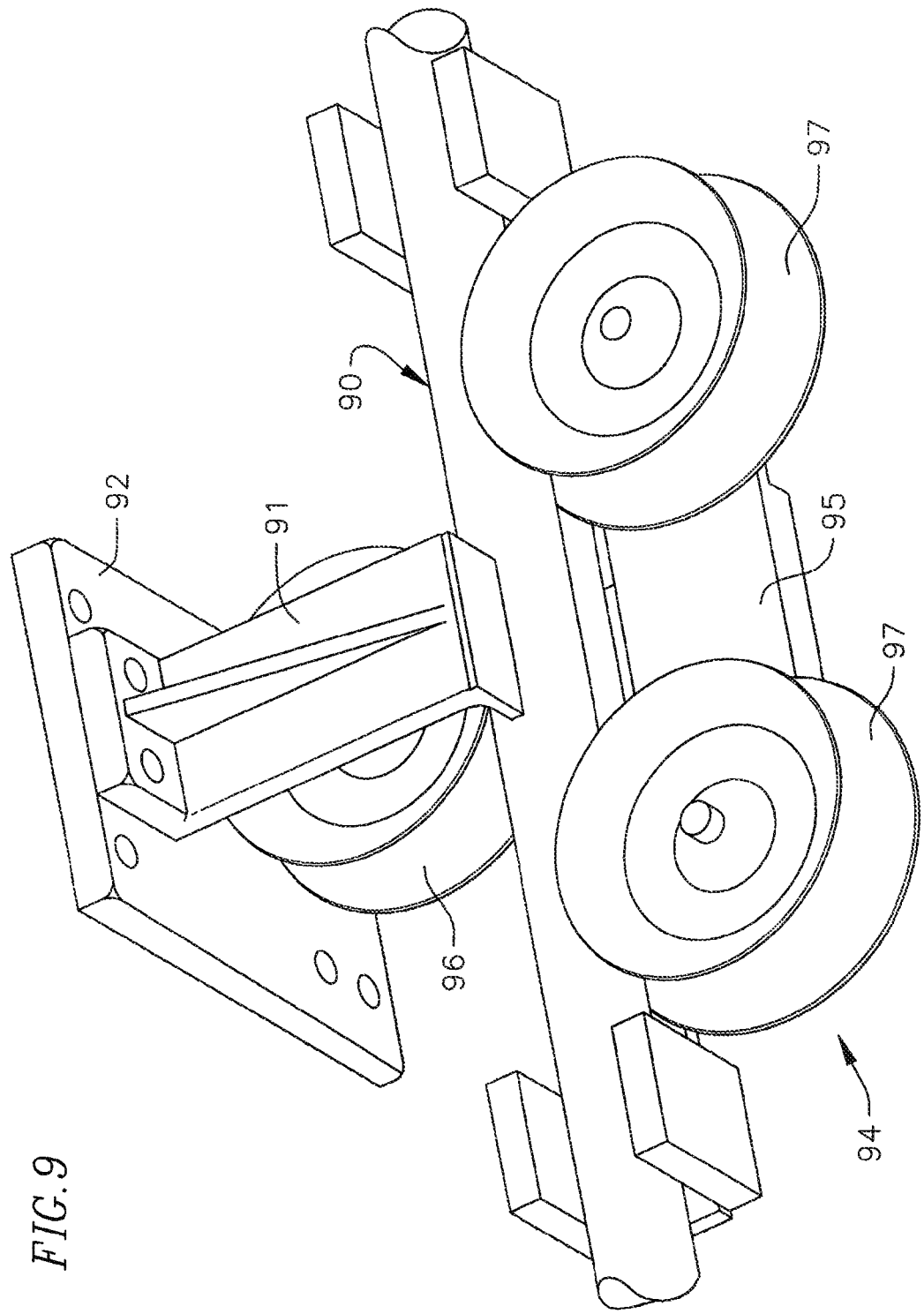
FIG. 9 is a fragmentary perspective view of structure which can be an area to movably support a turbine in a suspended state in a case where the foundation for the turbine is located above the turbine.

It was mentioned earlier that a turbine of this invention can be mounted in an inverted position. A form of inverted turbine in which air flows downward through the rotor blades is shown in FIG. 6; in that instance the turbine is not movable about its axis relative to its support structure. It is possible to mount in an inverted position a turbine which is movable about its rotor axis relative to the turbine's supports; FIG. 9 depicts one way in which an angularly movable turbine can be supported from above.

As shown in FIG. 9, a turbine support ring 90 can be supported below a foundation (not shown) by brackets 91 depending from a bracket base 92. Several brackets and bracket base assemblies can be attached to support ring 90 at spaced location around the ring. Each bracket base can be connected to the bottom surface of a suitable foundation. The base of the inverted turbine can be carried by the support ring via plural trolley assemblies 94, one of which is shown in FIG. 9. A trolley assembly 94 can include a frame 95 which can be suitably secured to the turbine base and to which are rotatably mounted upper 96 and lower 97 trolley rollers. The rollers preferably have circumferences contoured to mate closely with the contours of support ring 90. The trolley rollers are located on frame 95 so that the trolley assemblies move along the support ring and not vertically or radially relative to the support ring. Angular motion of the related turbine relative to the support ring axis can be obtained by operation of one or more drive motors connected to one or more of the upper trolley rollers.

It is envisioned that a right turn passage turbine according to this invention having a rotor diameter on the order of 80 feet can have a height of about 12 feet at its rotor plane.

As noted above, the power available in a wind is proportional to the cube of the wind's velocity, which means that doubling the wind velocity increases the available power by a factor of eight. A small difference in wind velocity can mean a large difference in available energy and in electricity produced, and therefore a large difference in the cost of electricity produced. It will be seen that the turbines of this invention, characterized by comparatively small structures which meaningfully increase inlet air velocities, can produce significant quantities of electricity. The low profiles (small heights) of the present turbines mean that the turbines can be used in places where high profile turbines cannot be used or are not acceptable.

Turbines of this invention operate in response to energy in air moving relatively toward the inlet air openings of the turbines. When the turbine is used at a geographically fixed location, such relative air movement is due to a wind moving past that location. It will be appreciated that such relative air can be caused by movement of the turbine itself, such as is the case where the turbine is located on a vehicle which is moved for reasons other then the creation of a relative wind past the turbine. Examples of such vehicles are trains and trucks. Such vehicles move at moderate to high speeds during significant portions of their useful lives, and so this invention contemplates the use of turbines of the kinds described above on such vehicles.

For example, a small version of a turbine of this invention can be mounted atop a driver's cab of a truck or a truck tractor to generate electricity useful in the operation of the vehicle. Electrical power generated by the turbine can be applied to operate refrigeration systems aboard the vehicle, as where the vehicle has cargo space for the transport of frozen or perishable foods. Also, turbine generated electrical energy can be used to charge (or recharge) batteries on the vehicle to operate vehicle electrical systems when the vehicle is not in motion or is moving at low speed.

The present invention has been described above with reference to certain structural arrangements embodying the invention and with reference to certain procedural aspects of the invention. The preceding description is not intended to be, nor should it be read as, a comprehensive catalog of all forms in which the invention can be embodied or procedurally implemented. Variations and modifications of the described aspects of the invention can be practiced without departing from the fair scope of the invention.

What is claimed is:

1. A wind turbine, comprising:
an airflow passage extending between an inlet end defining an inlet opening having a first area and an outlet end defining an outlet opening having a second area smaller than the first area, wherein the inlet end defines an angle relative to the outlet end;
a rotor proximate to the outlet opening, the rotor comprising a plurality of blades defining an annular area, wherein the blades are configured to rotate about a rotor axis substantially parallel to an axis of the outlet end of the airflow passage when subject to airflow moving through the airflow passage;
an output shaft coupled to the rotor to transmit mechanical energy from the rotor to a generator; and
a primary partition extending between the inlet opening and the outlet opening, the primary partition dividing the annular area of the blades into a forward half and a rearward half and dividing the airflow passage into an upper passage configured to direct airflow to the forward half of the annular area of the blades and a lower passage configured to direct airflow to the rearward half of the annular area of the blades such that the distribution of airflow across the blades is substantially uniform, wherein a portion of the primary partition proximate to the plurality of blades extends in a lengthwise direction substantially perpendicular to a plane of rotation of the blades.

2. The wind turbine of claim 1, wherein the angle is substantially 90 degrees.

3. The wind turbine of claim 1, wherein the inlet end of the airflow passage is substantially horizontal and the outlet end of the airflow passage is substantially vertical.

4. The wind turbine of claim 3, wherein a portion of the primary partition proximate to the inlet opening is substantially horizontal and a portion of the primary partition proximate to the outlet opening is substantially vertical.

5. The wind turbine of claim 1, wherein the primary partition comprises:
a horizontal wall;
a vertical semi-cylindrical wall coupled to the horizontal wall; and
first and second vertical wall segments extending radially outward from respective opposite ends of the vertical semi-cylindrical wall.

6. The wind turbine of claim 1, further comprising a plurality of fixed stator vanes disposed in the airflow passage upstream of the plurality of blades, wherein the plurality of stator vanes are configured to direct the airflow in a desired direction relative to the plurality of blades.

7. The wind turbine of claim 6, wherein the plurality of stator vanes defines an annular area substantially equal to the annular area of the plurality of blades.

8. The wind turbine of claim 1, wherein the airflow passage uniformly tapers between the inlet end and the outlet end.

9. The wind turbine of claim 1, wherein the airflow passage further comprises:
a plurality of upper secondary partitions extending between the inlet opening and the outlet opening, the upper secondary partitions dividing the upper passage into a plurality of substantially equal upper airflow subdivisions; and a plurality of lower secondary partitions extending between the inlet opening and the outlet opening, the lower secondary partitions dividing the lower passage into a plurality of substantially equal lower airflow subdivisions.

10. The wind turbine of claim 9, wherein each of the plurality of upper secondary partitions is substantially vertical and each of the plurality of lower secondary partitions is substantially vertical.

11. The wind turbine of claim 1, wherein the each of the plurality of blades extends radially outward relative to the rotor axis and wherein the plurality of blades extends around a perimeter of the rotor.

12. The wind turbine of claim 1, further comprising:
a rotatable base supporting the airflow passage; and
a drive motor operatively coupled to the base, wherein actuation of the drive motor rotates the base to reorient the airflow passage.

13. The wind turbine of claim 12, further comprising a wind direction sensor coupled to the drive motor, wherein the drive motor is configured to rotate the base based on input signals received from the wind direction sensor.

14. A wind turbine according to claim 1, further comprising at least one door hingedly coupled to the inlet end of the airflow passage, wherein the at least one door is configured to move between a closed position covering at least a portion of the inlet opening and an open position in which the door defines an effective inlet area larger than the first area of the inlet opening.

15. The wind turbine of claim 1, further comprising:
a base supporting the airflow passage; and
a plurality of rollers coupled to the base, wherein the rollers are configured to facilitate reorienting the airflow passage.

16. A wind turbine, comprising:
a rotor comprising a plurality of blades arranged in an annular array and configured to rotate about a vertical rotor axis, the plurality of blades defining an annular area;
an output shaft coupled to the rotor;
an upper airflow passage defining a horizontal inlet and a substantially vertical outlet, wherein the upper airflow passage is configured to direct an upper airstream to a forward half of the annular area;
a lower airflow passage defining a horizontal inlet and a substantially vertical outlet, wherein the lower airflow passage is configured to direct a lower airstream to a rearward half of the annular area, and
a primary partition dividing the annular area of the blades into the forward half and the rearward half and separating the upper airflow passage from the lower airflow passage, wherein a portion of the primary partition proximate to the plurality of blades extends in a lengthwise direction substantially perpendicular to a plane of rotation of the blades.

17. The wind turbine of claim 16, wherein a portion of the primary partition proximate to the horizontal inlets is substantially horizontal and a portion of the primary partition proximate to the vertical outlets is substantially vertical.

18. The wind turbine of claim 16, wherein the primary partition comprises:
a horizontal wall;
a vertical semi-cylindrical wall coupled to the horizontal wall; and
first and second vertical wall segments extending radially outward from respective opposite ends of the vertical semi-cylindrical wall.

19. The wind turbine of claim 16, further comprising:
a plurality of upper secondary partitions dividing the upper airflow passage into a plurality of upper airflow subdivisions; and
a plurality of lower secondary partitions dividing the lower airflow passage into a plurality of lower airflow subdivisions.

20. The wind turbine of claim 16, wherein each of the plurality of blades extends radially outward relative to the vertical rotor axis.

* * * * *